(12) United States Patent
Lautenbach et al.

(10) Patent No.: US 8,034,129 B2
(45) Date of Patent: Oct. 11, 2011

(54) AQUEOUS SOLUTIONS OF DIRECT DYES

(75) Inventors: Holger Lautenbach, Rheinfelden (DE); Adolf Käser, Bottmingen (CH)

(73) Assignee: BASF SE, Ludwigshafen (DE)

( * ) Notice: Subject to any disclaimer, the term of this patent is extended or adjusted under 35 U.S.C. 154(b) by 332 days.

(21) Appl. No.: 11/919,103

(22) PCT Filed: May 8, 2006

(86) PCT No.: PCT/EP2006/062115
§ 371 (c)(1),
(2), (4) Date: Oct. 23, 2007

(87) PCT Pub. No.: WO2006/122891
PCT Pub. Date: Nov. 23, 2006

(65) Prior Publication Data
US 2009/0077756 A1    Mar. 26, 2009

(30) Foreign Application Priority Data
May 18, 2005 (EP) .................... 05104137

(51) Int. Cl.
C09B 67/00 (2006.01)
C09B 67/26 (2006.01)
C09B 67/34 (2006.01)

(52) U.S. Cl. .............. 8/641; 8/636; 8/639; 8/115.51; 8/116.1; 8/919; 8/921; 162/162

(58) Field of Classification Search ......... 8/115.51–919, 8/921; 162/162
See application file for complete search history.

(56) References Cited

U.S. PATENT DOCUMENTS

| | | | | |
|---|---|---|---|---|
| 2,283,823 | A * | 5/1942 | Reuter et al. ............... | 534/742 |
| 4,478,681 | A * | 10/1984 | Muller et al. ............... | 162/140 |
| 4,685,933 | A * | 8/1987 | Wolff et al. ................. | 8/527 |
| 4,877,412 | A * | 10/1989 | Pedrazzi ..................... | 8/437 |
| 4,995,885 | A | 2/1991 | Morawietz .................. | 8/527 |
| 5,143,519 | A | 9/1992 | Stingelin .................... | 8/527 |
| 5,173,086 | A | 12/1992 | Bermes ...................... | 8/527 |
| 5,295,999 | A | 3/1994 | Hinrichs et al. ............. | 8/641 |
| 5,378,818 | A | 1/1995 | Mayer et al. ................ | 534/758 |
| 6,248,314 | B1 | 6/2001 | Nakashimada et al. | |
| 6,521,032 | B1 | 2/2003 | Lehmann et al. | |
| 6,576,025 | B2 | 6/2003 | Lapierre | |
| 2002/0007524 | A1* | 1/2002 | Sorensen ..................... | 8/405 |
| 2002/0139957 | A1 | 10/2002 | Matsuo et al. | |
| 2003/0208856 | A1 | 11/2003 | Miyabe et al. | |
| 2004/0049860 | A1* | 3/2004 | Cottard et al. .............. | 8/405 |
| 2005/0071932 | A1 | 4/2005 | Lautenbach et al. ........ | 8/405 |
| 2006/0053569 | A1* | 3/2006 | Radisson et al. ............ | 8/405 |
| 2008/0307588 | A1 | 12/2008 | Lautenbach et al. | |

FOREIGN PATENT DOCUMENTS

| | | |
|---|---|---|
| CH | 0 503 091 | 3/1971 |
| EP | 0 369 940 | 11/1988 |
| EP | 0 451 092 | 10/1991 |
| EP | 0 553 672 | 1/1992 |
| EP | 0 479 056 | 4/1992 |
| EP | 0 601 401 | 6/1994 |
| EP | 1086999 | 3/2001 |
| EP | 1 235 881 | 2/2004 |
| GB | 1 333 937 | 10/1973 |
| JP | 04/122933 | 4/1992 |
| JP | 2000/229820 | 8/2000 |
| WO | 01/68042 | 9/2001 |
| WO | 03/064539 | 8/2003 |

OTHER PUBLICATIONS

USPTO, Office Action dated Jan. 13, 2010 for Application No. 11/919,102 filed on Oct. 23, 2007.

* cited by examiner

*Primary Examiner* — Lorna M Douyon
*Assistant Examiner* — Tri V Nguyen
(74) *Attorney, Agent, or Firm* — Drinker, Biddle & Reath

(57) ABSTRACT

The invention relates to an aqueous dye solution comprising a) 5 to 30% by weight of an anionic or cationic direct dye, b) 0.01 to 5% by weight of the compound of formula (1), in which M represents hydrogen, an alkali metal or alkaline earth metal, ammonium or ammonium, that is mono-, di-, tri- or tetra-substituted by $C_1$-$C_4$alkyl or $C_2$-$C_4$hydroxyalkyl or mixtures thereof, c) 0 to 10% by weight of an inorganic or an organic acid, d) 0 to 20% by weight of further additives and e) water to complete to 100%, with the proviso that direct dyes of the formula (2) in which K is a residue of a coupling component of the acetoacetanilide, pyridone, pyrazolone or pyrimidine series and M is as defined above, are excluded, a process for their preparation and the use thereof for dyeing paper.

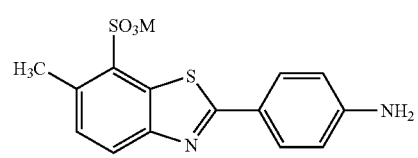

(1)

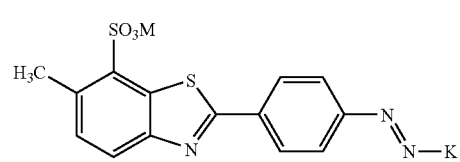

(2)

4 Claims, No Drawings

AQUEOUS SOLUTIONS OF DIRECT DYES

The present invention relates to storage stable, concentrated aqueous solutions of direct dyes, both anionic dyes and cationic or basic dyes, a process for their preparation and the use thereof for dyeing paper.

In WO 03/064539 A1 storage stable liquid formulations of specific azo dyes based on 2-(4-aminophenyl)-6-methylbenzothiazole 7-sulphonic acid as the diazo component are disclosed. The key component of these formulations is indeed this diazo component, which apparently functions by hindering liquid crystal formulation, which would otherwise lead to subsequent precipitation of the dye from solution. It would thus be expected that addition of 2-(4-aminophenyl)-6-methylbenzothiazole 7-sulphonic acid as a formulation aid for providing storage stable solutions of dyes could only function when this structural unit is also present in the dye in question.

Surprisingly, however, this has not been found to be the case and that 2-(4-aminophenyl)-6-methylbenzothiazole 7-sulphonic acid indeed functions as an extremely efficient formulation aid in the preparation of storage stable formulations of a vast range of apparently unrelated dyes. In addition to their storage stability, the resulting solutions exhibit a surprisingly low dynamic viscosity, which property further recommends their use, especially in the dyeing of paper.

Accordingly, the present invention relates to an aqueous dye solution comprising
a) 5 to 30%, preferably 10 to 25%, by weight of an anionic or cationic direct dye,
b) 0.01 to 5%, preferably 0.1 to 2%, by weight of the compound of formula

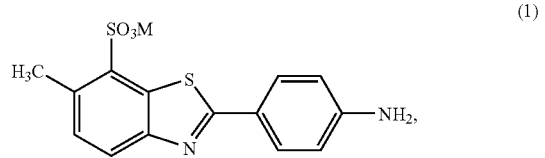

(1)

in which
M represents hydrogen, an alkali metal or alkaline earth metal, ammonium or ammonium, that is mono-, di-, tri- or tetra-substituted by $C_1$-$C_4$alkyl or $C_2$-$C_4$hydroxyalkyl or mixtures thereof,
c) 0 to 10% by weight of an inorganic or an organic acid,
d) 0 to 20% by weight of further additives and
e) water to complete to 100%, with the proviso that direct dyes of the formula

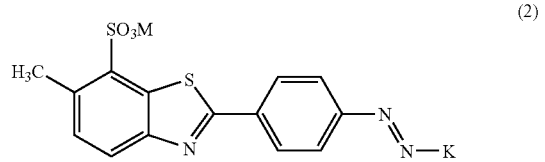

(2)

in which
K is a residue of a coupling component of the acetoacetanilide, pyridone, pyrazolone or pyrimidine series and
M is as defined above, are excluded.

Where the solutions of the invention are solutions of anionic dyes, these direct dyes are preferably selected from dyes containing at least one sulfonic acid and/or carboxylic acid group and are derived from the following dye classes: metal-free or metallic monoazo, disazo and polyazo dyes, pyrazolone, thioxanthone, oxazine, stilbene, formazan, anthraquinone, nitro, methine, triphenylmethane, xanthone, naphthazarine, styryl, azastyryl, naphthoperinone, quinophthalone, and phthalocyanine dyes.

Typical examples of anionic direct dyes are listed in the Colour Index International, Fourth Edition Online (url: http://www.colour-index.org) and may be selected from C.I. Direct Yellows 1-177, C.I. Direct Oranges 1-122, C.I. Direct Reds 1-277, C.I. Direct Violets 1-108 and C.I. Direct Blues 1-313, with the proviso that dyes of formula (2) are excluded.

Where the solutions of the invention are solutions of cationic dyes, these cationic direct dyes are basic dyes. These so-called basic dyes are selected from the following classes: acridine, anthraquinone, azine, azomethine, azostyryl, mono-, bis- and polyazo, benzimidazole, benzothiazole, cyanine, di- and triarylmethane, ketone imine, methane and polymethine, naphthostyryl, nitro, oxazine and dioxazine, phthalocyanine, quinoline, quinophthalone, thiazine, thiazole and xanthene derivatives.

Typical examples of cationic direct dyes are listed in the Colour Index International, Fourth Edition Online (url: http://www.colour-index.org) and may be selected from C.I. Basic Yellows 1-108, C.I. Basic Oranges 1-69, C.I. Basic Reds 1-118, C.I. Basic Violets 1-51 and C.I. Basic Blues 1-164.

The invention is especially useful for solutions of specific dyes, such as C.I. Basic Yellow 99 and 106, C.I. Basic Red 111, C.I. Basic Blue 100 and 153, C.I. Direct Yellow 11, 50 and 84, C.I. Direct Orange 29 and 102, C.I. Direct Red 23, 80, 81, 239, 254 and 262, C.I. Direct Violet 9, 35 and 51 and C.I. Direct Blue 75, 86, 87, 199, 290 and 301.

Where the composition of the invention contains an organic or inorganic acid, those acids particularly suited may be selected from, for example, hydrochloric acid, sulphuric acid, phosphoric acid, formic acid, acetic acid, propionic acid, glycolic acid, gluconic acid, methanesulphonic acid, citric acid, succinic acid, lactic acid, glutamic acid, adipic acid or mandelic acid. Any of these acids may be used alone or in an acid mixture, although formic acid is most preferred.

Although the addition of an acid to the composition of the invention is optional, preferably the acid is present in an amount of between 1 and 10% by weight, most preferably between 1 and 5%, based on the total weight of the composition.

The dye solutions according to the invention may, in addition, contain further additives as component d), such as water-soluble organic solubilizers, examples of which are urea, formamide, ε-caprolactam, sugars, such as dextrin, maltose or lactose, carboxycelluloses, such as xanthan, dimethylformamide, 1,2-diaminopropane, 1-phenoxy-2-propanol and polyhydric alcohols such as ethylene glycol or glycerol, whereby ε-caprolactam and 1-phenoxy-2-propanol are preferred. Further additives which may be present in the solutions of the invention are, for example, hydrotropic agents, viscosity regulators, dispersing agents, microbicides and pH adjusting agents.

As pH adjusting agents, it is possible to use acids, bases or buffers which are conventional and are usually used for the pH adjustment of dye formulations, for example mineral acids, such as hydrochloric acid, sulphuric acid or phosphoric acid, low molecular weight aliphatic carboxylic acids, for example having from 1 to 6 carbon atoms, such as formic acid, acetic acid, lactic acid or citric acid, or bases, such as alkali metal hydroxides or carbonates, or also aliphatic low molecular weight amines, such as those which can be used for the corresponding salt formation of the above mentioned acid groups, of which ammonia or triethanolamine are preferred.

As buffers, it is possible to employ, for example, mono- or disodium phosphate, sodium acetate or ammonium sulphate.

The pH of the concentrated dye solutions can thus be adjusted as required, depending upon the particular dye in question. Preferably, however, the pH of the solutions generally lies within the range of from 3 to 11, whereby, in the case of cationic dyes, a range of from 4 to 6 is preferred, whilst, in the case of anionic dyes, a pH value of between 6 and 8 is preferable.

Preferably, the aqueous solutions also contain known products as are usually employed for protection against the harmful effect of microorganisms, principally products which inhibit the growth of microorganisms or also microbicides, particularly fungicides. These may be employed in low concentrations, for example, in the range of from 0.01 to 1%, especially from 0.05 to 0.5%.

Although the addition of such additives to the composition of the invention is optional, preferably they are present in an amount of between 1 and 20% by weight, most preferably between 1 and 10%, based on the total weight of the composition.

In a further aspect, the invention relates to a process for the preparation of the dye solution according, which process comprises stirring the dye with a mixture of water, the compound of formula (1) and, if desired, components c) and d), at a temperature between room temperature and 90° C., preferably between 30 and 60° C. and, if necessary, filtering.

Preferably, the dyes of the invention are firstly purified, subsequent to manufacture, either by washing the crude filter cake to remove inorganic salts, or by membrane separation techniques such as micro- or ultrafiltration.

Preferably, the anionic dyes are present in the form of readily water-soluble salts. Consequently, suitable salts are alkali metal salts such as lithium potassium or, especially, sodium salts or ammonium salts, mono-, di-, tri- or tetraC$_1$-C$_4$alkyl ammonium salts or C$_2$-C$_4$hydroxyalkyl ammonium salts or mixtures thereof.

Similarly, in the case of the cationic dyes, the counter ion should be such as to ensure sufficient water solubility. Preferred salts in this case are, for example, halogenides, especially chlorides, sulphates, methosulphates and, in particular lower aliphatic carboxylates such as formates, acetates and lactates.

The formulation of the invention is suitable for dyeing natural or synthetic materials, in particular cellulosic materials in any desirable shade. In particular, the formulations are suitable for dyeing paper and paperboard.

Consequently, in a further aspect, the invention relates to the use of the solutions for the dyeing of paper, by treating the paper with a liquid composition as defined previously. The liquid preparation is used, optionally after dilution with water, for the dyeing of paper or paperboard, whereby these materials can be dyed, for example, in the pulp, by brushing or immersion or by applying to the paper surface by coating or spraying or for application in a continuous dyeing process, whereby the paper or paperboard which has been dyed with the liquid composition of the invention constitutes a still further aspect of the invention.

The following examples serve to illustrate the invention, without intending to be restrictive in nature. Parts and percentages are by weight unless otherwise stated.

EXAMPLE 1

A mixture comprising 100 parts of ε-caprolactam, 10 parts of 2-(4-aminophenyl)-6-methylbenzothiazole 7-sulphonic acid, 30 parts of formic acid and 260 parts of water are stirred and heated to 40° C. 600 parts of a moist filter cake, which was previously precipitated at pH 9.0 and washed free of inorganic salts, containing 37.5% of the dye C.I. Basic Blue 100 of the formula $$CuPC\{[SO_2NH(CH_3)_2]_{2-3}SO_3H\}_{1-2} \quad (101),$$

in which PC represents phthalocyanine, are then added. After stirring for 2 hours at 60° C., the mixture is cooled and filtered to yield a solution containing 22.5% of the dye of formula (101), 10% ε-caprolactam, 1% of 2-(4-aminophenyl)-6-methylbenzothiazole 7-sulphonic acid and 3% of formic acid.

The resulting solution exhibits a dynamic viscosity of 300 mPas at 5° C., is stable to storage over a period of several months at −10 to 50° C. and is readily dilutable with water.

To obtain comparable viscosity and storage stability in the above example, the 1% of 2-(4-aminophenyl)-6-methylbenzothiazole 7-sulphonic acid would need to be replaced by 5% of benzyl alcohol.

EXAMPLE 2

A salt free concentrate of the dye C.I. Direct Orange 102, obtained by ultrafiltration of the product directly resulting from synthesis, is treated with a sufficient quantity of 2-(4-aminophenyl)-6-methylbenzothiazole 7-sulphonic acid, such that, after dilution to 15% a solution containing 0.3% is obtained. The dynamic viscosity is thereby reduced from 175 to 36 mPas at 25° C. and the resulting formulation shows no sign of sedimentation during storage at −10 to 50° C. over a period in excess of 6 months.

In comparison, when the same concentrate is treated with 5% ε-caprolactam and diluted correspondingly, the resulting solution, although exhibiting comparable dynamic viscosity, shows clear signs of sedimentation after storage for only 1 week.

The invention claimed is:

1. A storage stable aqueous dye solution consisting of:
   a) 5 to 30% by weight of an anionic or cationic direct dye;
   b) 0.01 to 5% by weight of a compound of formula (1)

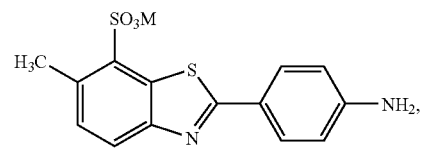
(1)

wherein
   M is hydrogen, an alkali metal or alkaline earth metal, ammonium or ammonium that is mono-, di-, tri- or tetra-substituted by C$_1$-C$_4$alkyl or C$_2$-C$_4$hydroxyalkyl or mixtures thereof;
   c) 0 to 10% by weight of an inorganic or an organic acid;
   d) 0 to 20% by weight of further additives, said further additives selected from the group consisting of water-soluble organic solubilizers, hydrotropic agents, viscosity regulators, dispersing agents, microbiocides, and pH adjusting agents; and
   e) water to complete to 100%;
   with the proviso that direct dyes of formula (2)

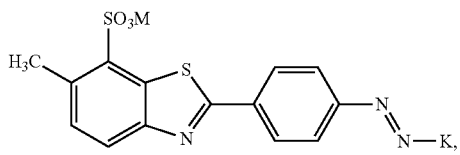

(2)

wherein

K is a residue of a coupling component of an acetoacetanilide, a pyridone, a pyrazolone, or a pyrimidine; and M is as defined above, are excluded.

2. The storage stable aqueous dye solution according to claim 1, wherein the anionic direct dye contains at least one sulfonic acid and/or carboxylic acid group and is derived from a metal-free or metallic monoazo, disazo, or -polyazo dye, a pyrazolone dye, a thioxanthone dye, an oxazine dye, a stilbene dye, a formazan dye, an anthraquinone dye, a nitro dye, a methane dye, a triphenylmethane dye, a xanthone dye, a naphthazarine dye, a styryl dye, an azastyryl dye, a naphthoperinone dye, a quinophthalone dye, or a phthalocyanine dye.

3. The storage stable aqueous dye solution according to claim 1, wherein the cationic direct dye is a basic dye selected from the group consisting of an acridine basic dye, an anthraquinone basic dye, an azine basic dye, an azomethine basic dye, an azostyryl basic dye, a mono-, bis- or polyazo basic dye, a benzimidazole basic dye, a benzothiazole basic dye, a cyanine basic dye, a di- or triarylmethane basic dye, a ketone imine basic dye, a methane or polymethine basic dye, a naphthostyryl basic dye, a nitro basic dye, an oxazine or dioxazine basic dye, a phthalocyanine basic dye, a quinoline basic dye, a quinophthalone basic dye, a thiazine basic dye, a thiazole basic dye, and a xanthene derived basic dye.

4. The storage stable aqueous dye solution of claim 1, wherein the direct dye is anionic.

* * * * *